Figure 1:
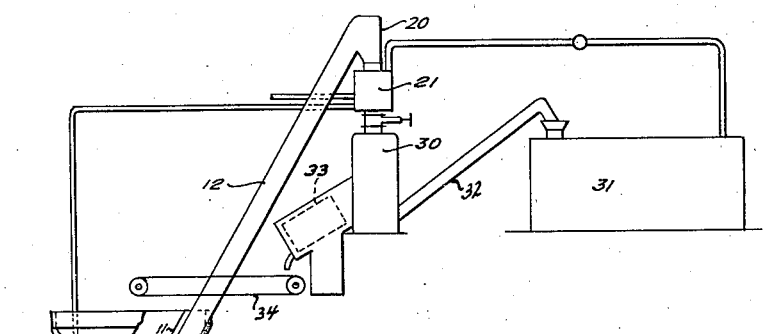

May 18, 1937.    J. C. MARS    2,080,780
PROCESS AND APPARATUS FOR TREATING WASTE
Filed Jan. 30, 1933    2 Sheets-Sheet 1

INVENTOR
JAMES C. MARS,
BY
ATTORNEY

May 18, 1937. J. C. MARS 2,080,780
PROCESS AND APPARATUS FOR TREATING WASTE
Filed Jan. 30, 1933 2 Sheets-Sheet 2

INVENTOR
JAMES C. MARS
BY
ATTORNEY

Patented May 18, 1937

2,080,780

UNITED STATES PATENT OFFICE 2,080,780

PROCESS AND APPARATUS FOR TREATING WASTE

James C. Mars, New York, N. Y.

Application January 30, 1933, Serial No. 654,142

5 Claims. (Cl. 210—2)

This invention relates to methods and apparatus for the separation and disposal of finely divided suspended matter from liquids such as sewage, trade wastes and the like. More particularly, the invention relates to a method and apparatus in which a carrier material in the form of large pieces is used to separate the suspended matter from the liquid and to carry the matter thus deposited through subsequent steps, including drying and other treatment, e. g., thermal decomposition, requiring the passage of gas or vapors over or through the material.

To summarize the prior art briefly, it has been known to filter sewage through filter presses and beds of sand, gravel, etc., in which the openings are of capillary dimensions, and which require frequent treatment to remove the deposited sludge and reopen the pores of the filter. It is old to use coarse material of dimensions which could be used in the present invention, as so-called trickling filters, etc., where the action is not a filtering action at all, but a biological destruction, and the sewage is not flowed through the "filter" so as to submerge the "filter material", but is either trickled over the material so as to leave continuous spaces for access of air, or is flowed into the material so as, to submerge it, allowed to stand a while, and then drawn off so as to permit access of air. The action of such a so-called filter is not, in fact, a filtering action at all, but is a biological action, and the so-called "filter material" does not have a filtering action, but merely serves to provide an open structure to which the colonies of treating organisms can attach themselves and remain while subjected to the sewage and aeration.

Furthermore, it has been suggested prior to this invention to carbonize sewage sludge, or completely burn it. However, it has never proven practical to burn or to carbonize sewage sludge, because of its slimy character, which causes uncontrollable foaming and boiling during drying because of the vapors and gases generated thereby. If, in spite of the extremely objectionable boiling, a dried product is obtained, it is so fragile that it cannot be satisfactorily burned, but breaks down almost immediately and is carried off as an unburned powder. Such coke obtained in this manner, without a supporting carrier, is so fragile as to be useless as a subsequent carrier. It has even been suggested to use such fragile carbon residue in a filter bed, and to regenerate the filter material by carbonization. Such a filter would correspond to boneblack filters as used heretofore, for example, in the filtration of sugar liquors, etc., and like them would be impracticable for large scale treatment of sewage and trade wastes. Furthermore, the regeneration of the filter material in such case would be subject to all the difficulties heretofore experienced in attempts to carbonize sewage sludge alone.

I have now found that the use of relatively large pieces of carrier material for the separation of suspended matter makes practicable and economical drying and thermal decomposition or other treatment involving the passage of gas through or over the deposited matter. A deposition unit which utilizes such a carrier material according to my invention not only serves to coat the carrier material with the suspended solids from the sewage, etc., but actually effects a more complete separation of suspended matter from the sewage, etc., than is possible by any but the very best of the processes known prior to our invention, and because of the smaller area required, and the greater rate of flow which is possible in the operation of such a unit, and because of the fact that the filter material can be repeatedly and economically cleaned and sterilized ready for re-use, the cost of installation and of operation may be substantially less than with other separation methods heretofore known.

Accordingly, it is an object of the present invention to provide a method and apparatus which can be manufactured, installed and operated at lower cost than systems heretofore used which are of comparable effectiveness. Another object of the invention is to provide a method and apparatus for disposing of the deposited matter and cleaning and sterilizing the filter material. Another object of the invention is to avoid all nuisance, including odor and insect. Other objects will be apparent from the following specification.

Figure 2:
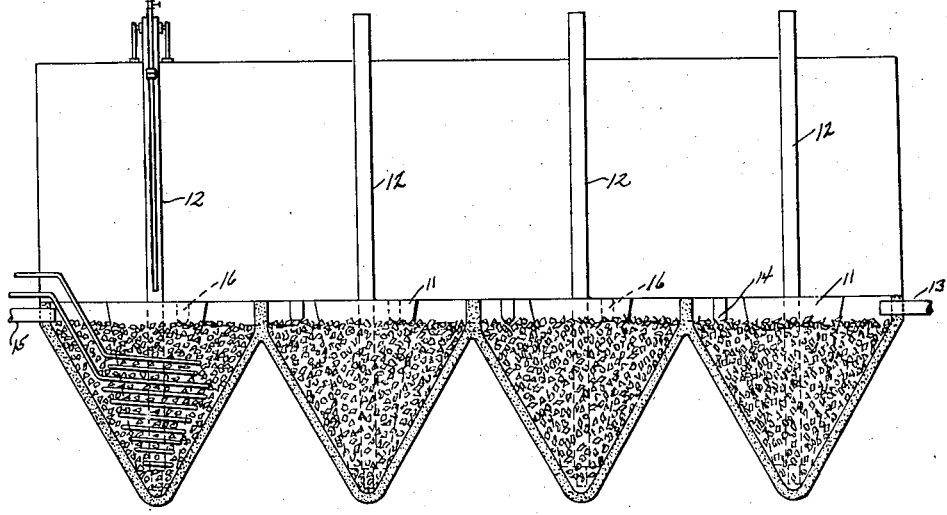
Figure 3:
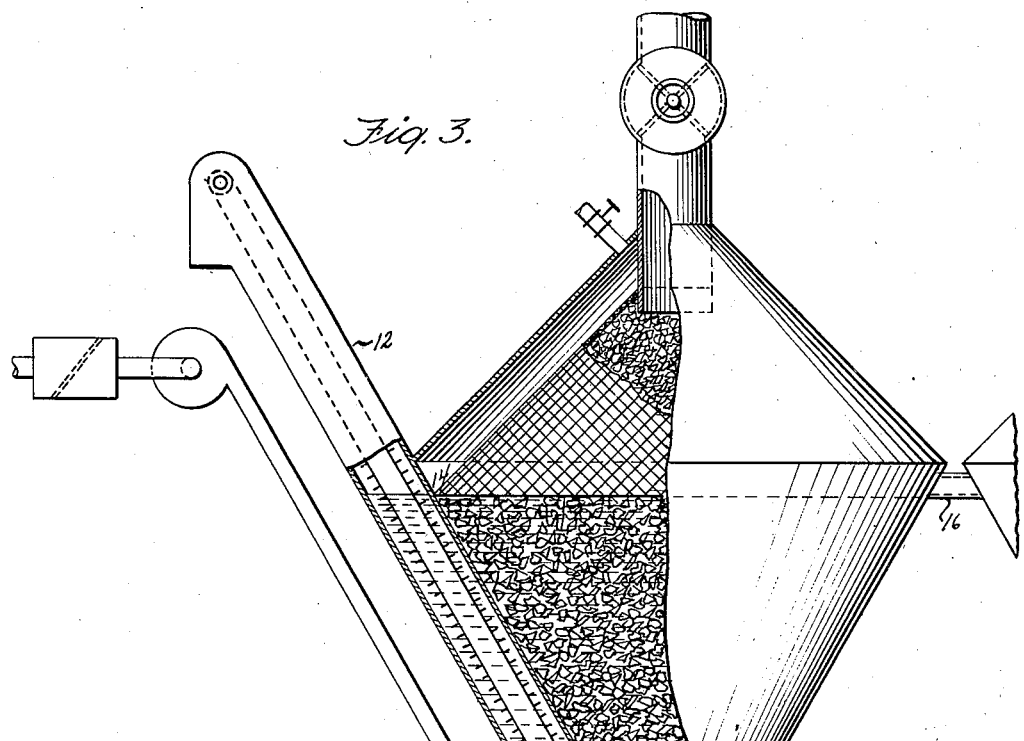
Figure 4:
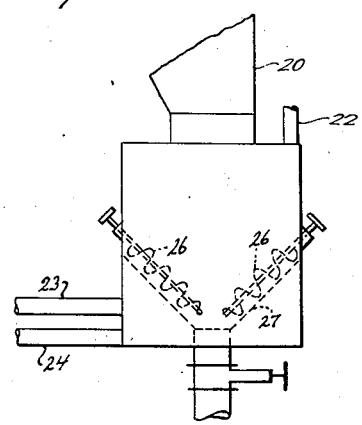

In the accompanying drawings, Fig. 1 is a diagrammatic view in elevation and partly in section of an apparatus constructed according to my invention;

Fig. 2 is a vertical longitudinal section through a separator unit similar to that shown in Fig. 1 embodying my invention; and Fig. 3 is a view partly in vertical section of a separator unit which may replace the similar units of Fig. 1, but with certain modifications which will be apparent; and Fig. 4 is an enlarged phantom view of the drying chamber illustrated diagrammatically in Fig. 1.

Referring to Fig. 1, where I have shown diagrammatically the various apparatus units used in a preferred embodiment of my invention and their interrelation, the reference character 10 indicates a filter cell of a separator unit, in this case shown as a conical tank having a baffle 11 behind which the influent is led to the bottom of the tank, and behind which also the foul carrier material may be removed, e. g., by means of a chain conveyor 12. The influent is allowed to enter behind the baffle 11 from a suitable conduit or main 13, while the effluent from each unit overflows into a gutter 14, from which the effluent passes on to the inlet 13 of the next cell, or to the effluent main 15.

Each of the filter cells 10 is filled with a filter or carrier material which should be sufficiently large to permit free passage of the liquid, with its suspended matter, through the interstices, and to avoid capillary straining action, such as would be encountered in a true filter used prior to my invention. As carrier material, numerous materials may be used which are capable of withstanding the conditions of the treatment without disintegrating. Thus, for example, coke, screened cinders, washed ashes, crushed rock, rubble, charcoal and broken bricks, e. g., diatomaceous bricks, pumice rock, and porous ceramic materials may be mentioned as materials suitable for use under various conditions. The size used in any one cell should advantageously be fairly uniform, so as to leave relatively large interstices between the pieces. The particular size used, however, may be chosen from a substantial range,—for example, from pieces which just pass a quarter-inch screen up to those which are one inch or more in diameter. Where several cells are to be used in the separator unit as is shown, for example, in Fig. 2, it will be preferable to use in the cells which are first encountered by the sewage, etc., a bed in which the interstices are relatively small, and to use in the later cells of the series larger pieces of the carrier material. The fact that this arrangement produces a more efficient filtration is in itself a striking evidence of the fact that my separator is not a straining action in any sense similar to the action of prior art filters. With this arrangement, the coarse material is removed on the filter with the smallest interstices which, of course, in this case will require more frequent renewal of the filter material within the cell, while the finest material is removed in the cell with the largest pieces of the carrier material.

I have also found that the separation by the coarse carrier material may be combined with the use of a filter aid such as diatomaceous earth, finely divided carbon, etc., and for this purpose, the dust which is produced by the breaking up of the residue from carbonization of the sewage sludge upon subsequent handling of the carrier material I have found to be well suited for this purpose. In other words, the carbon residue from the sewage sludge will, in the operation of the cyclic process as herein described, produce a filter aid which will tend, in settling through the interstices of the bed, to adsorb suspended matter from the sewage and deposit it eventually upon the surfaces of the carrier, or in the bottom of the separator cells. It will also be desirable, in some cases, to use coal dust of a suitable coking coal for this purpose, since the coal thus added will tend to bind and give strength to the carbon residue produced from the sludge in a subsequent carbonization step of the process. I have found that LaFollette, Tennessee, coal is particularly well suited for this purpose, and that about ten per cent. of the dry weight of coke used as carrier material may advantageously be added upon each recarbonization. In some cases, all of this coal my be added as coal dust, serving to some extent, at least, as a filter aid in the separator unit. It may, however, be preferable to add some or all of the coal to the carrier material and sludge after it has been removed from the separator unit. The amount of this finely divided matter should, of course, never be sufficient to interfere with the free flow of the liquid through the interstices of the separator beds.

In the operation of the filter as described, the sewage enters through the influent main 13, passes down behind the baffle 11 of the first cell 12, and into the bed of carrier material. After passing up through the bed of carrier material in the first cell, the effluent drains off into the gutter 14, and from there through the opening 16 into the space behind the baffle 11 of the next cell of the unit. When the liquid has drained from the last cell into the gutter 14, it passes off through the effluent main 15 and, either with or without subsequent purification treatment, such as aeration, chlorination, etc., may be discharged.

In the preferred embodiment, the carrier material used is coke, or other porous material which carries entrapped air sufficient to render it buoyant in the liquid. Accordingly there will be near the bottom of the cell a substantial free space in which the liquid can spread out and cross currents be absorbed before it enters the bed of carrier material. The fact that the bed is floated in the liquid also relieves the carrier material at the bottom of the bed from the weight of the material above it which might otherwise tend to pack the material. Thus it will remain loose, and its interstices remain open. As the filtration proceeds, the coke or other buoyant carrier material will gradually become waterlogged or coated with sufficient sludge so that it will become heavier than the liquid in the cell, whereupon the waterlogged or fouled pieces of carrier material will eventually sink to the bottom of the cell.

From time to time the material in the cell should be replaced with fresh material. This can be accomplished by digging out the material from the cell, e. g., by means of the conveyor 12, and by adding fresh material to the cell. Ordinarily it will not be necessary to remove the entire charge of the carrier material from the cell at any one time, and in fact I prefer to remove only a part of the material from the bottom, adding to the top sufficient material to make up for that which has been removed.

Such removal should, of course, be effected before the interstices of the bed are completely clogged with deposited matter, but up to this point considerable latitude may be allowed in the degree of deposition which is allowed to accumulate before the renewal is effected. It is an important advantage of my invention that the velocity of flow through the separator unit may be varied over a relatively wide range without substantially decreasing its effectiveness, and thus holiday populations, storms, wash day, and other peak load conditions may be satisfactorily taken care of without necessity for depreciating the condition of the effluent. Under such conditions, however, it may be necessary to renew the carrier material in the filter cells more frequently than would be required with a lower rate of flow. If the capacity of the sludge destruction plant is not sufficient to take care of the increased amount of carrier material and sludge removed from the cells under such conditions, the excess may be stored. In order to avoid nuisance, this excess should be stored in airtight containers, and provision made for drawing off and burning any gases which may be generated during the storage. Thus peak loads may be absorbed in the separator unit; and the destruction of the excess separated matter may be distributed over the periods of lesser load.

In another form of filter cell, shown in Fig. 3, which may be used in connection with the present invention, instead of introducing the influent behind the baffle 11, as described above, the influent is introduced tangentially into the space beneath the floating filter mass; the filter cell at this point being circular in cross-section. By this means a peripheral circular flow is maintained, which, by washing the filter material at the edge, prevents the clogging of the filter and allows the heavily coated material within this peripheral washed area to settle through a mass of liquid which is relatively quiescent, and in which, therefore, the matter deposited on the surface does not tend to become washed off to any serious extent.

If desired, the filtration in one or more of the cells may be combined with an additional purification, such as chlorination, aeration, or electrical sterilization.

Although I have chosen in the embodiment illustrated a conical form of separator cell, because I have found advantage in the spreading flow from top to bottom, it will be understood that cells of other shape may be used, and that my invention is in no sense limited to a cell of such shape.

The mixture of carrier material and sludge which is removed from the filter cell 10 is, in the embodiment illustrated, deposited by the conveyor 12 into a hopper 20 of a dehydrator 21. This dehydrator consists essentially of a closed receptacle having an inlet and outlet 22 and 23 for drying gases, vapors, etc. Either the opening 22 or 23 may be used to admit hot gases for drying; and the other may advantageously be connected to a suction means, so that the drying may be effected at reduced pressure. An outlet 24 is also provided for drawing off any liquid which may drain from the material.

Since during the drying of the sludge layer on the carrier material it has a tendency to cake, it will be necessary, if a small outlet is used as shown at 25, to provide means for breaking up the cake which is formed by the cementing together of the carrier material with the dried sludge coatings. For this purpose I have shown in the drawings a pair of worm screws 26, but it will be understood that numerous other devices may be used for this purpose, if the design of the apparatus is such as to require the breaking up. I have also found it advantageous to carry out the drying and the subsequent carbonization in the same apparatus, so as to avoid the necessity for breaking apart of the cemented carrier material.

Beneath the worm screws 26 in the embodiment illustrated, are sloping screens or grate bars 27, which lead the dried or carbonized material to the outlet 25.

Beneath the dehydrator 21 is a retort or other heat-treating apparatus 30. This retort 30 may be heated, for example, by hot gases from the gas generator or producer 31, which may be passed up through the drying material, and which, as initially received, will be at a temperature such as to effect thermal decomposition of the dried sludge on the carrier material. Hot gases from the retort or the gas producer may also be used for drying the material in the dehydrator, and in such case the fuel gas from the producer or generator 31 may be enriched by gases released in the retort, and to a minor extent by alcohols and other combustible vapors which may be released in the dehydrator. Such gas may advantageously be used in continuance of the process, e. g., for further heating of the retort or the gas producer or generator, or for heat required in the drying of the material. Any excess gas may, of course, be sold or diverted for other purposes.

If the vapors from the dehydrator are not already too far diluted by hot drying gases which may have passed therethrough, these vapors may likewise be returned to the gas generator, where the water vapor thereof will be converted into water gas enriched by such combustible gases or vapors as may already have been present.

Although I have shown the gas generator 31 separate from the retort 30, except for the connection by which the carbon residue may be transferred to the gas generator or producer from the retort, and the hot gases from the generator or producer to the retort, it may in some cases be advantageous to combine the functions of these two pieces of apparatus into a single apparatus unit which may serve first to carbonize the sludge on the carrier material, and thereafter, by combustion in air or steam, to produce hot gas which will subsequently be used to heat additional material which is being carbonized or dried therein.

The carbon residue from the retort may be burned in the gas producer or generator 31 to which it may be transferred through the conveyor 32, or it may be discharged into the screen 33, where the fine materials may be removed, and the coarser pieces may be returned to the filter cells, e. g., by means of the belt conveyor 34. If, during the carbonization treatment, the pieces of carrier material have become cemented together by the coke formed during the process, it may be desirable to subject the residue from the retort to a light crushing or breaking operation before screening and returning to the filter cell.

It will be observed that the function of the carrier material and the importance of its size is present throughout the process from the initial deposition to the final destruction by combustion in the gas generator or producer. In the drying operation, the carrier material serves to hold the sludge in relatively thin layers, but of substantial thickness, so that the drying gases may pass over the extended surfaces of such layers, and effect rapid drying thereof without objectionable foaming and boiling of the slimy material. In the initial stages of the thermal decomposition step, the carrier serves, by holding the dried sludge in thin layers to permit the free escape of gases formed during this step without objectionable foaming, and without excessive production of carbon dust resulting from such boiling of the material. In the latter stages of the thermal decomposition, and also in the gas generator or producer, the carrier serves to hold the carbon residue from the sludge, and to prevent its being crushed and powdered and blown away by the gases. It is because of the presence of the mechanically strong and refractory carrier material in relatively large sized pieces that the destruction of the sludge by drying and thermal decomposition is practicable at all.

Although I have described above a preferred embodiment of my invention and various modifications thereof, it is to be understood that the invention may be practiced with other apparatus, and that numerous changes and modifications may be made without departing from the spirit or the scope of this invention.

This application is a continuation in part of my prior application Ser. No. 401,428, filed October 22, 1929, in part of my application Ser. No. 454,878, filed May 23, 1930, and in part of my application Ser. No. 464,478, filed June 28, 1930.

What I claim is:

1. The method of treating sewage sludge and the like which comprises passing a sludge bearing liquid through a bed consisting of pieces of carrier material submerged in said liquid, the pieces of which are sufficiently large to permit ready flow of the liquid therebetween and substantially to avoid capillary relations therebetween, thereby depositing sludge from said liquid upon said carrier pieces, draining liquid from the carrier material with the deposited sludge remaining thereon and before the interstices are substantially filled with deposited sludge, passing a stream of drying gases through a pile of the carrier with the deposited sludge thereon and thereafter removing the dried material from the surface of the carrier and re-using the carrier material in the process.

2. The method as defined in claim 1 in which the sludge is subjected to a destructive distillation treatment after drying.

3. The method as defined in claim 1 in which the sludge is removed from the carrier by combustion.

4. An apparatus for treating sewage or the like, which comprises a container for a carrier material adapted to direct a flow of sewage through a bed of carrier material therein, a massive bed of carrier material within said container consisting of pieces sufficiently large to permit ready flow of sewage therebetween and substantially to avoid capillary relation therebetween, and means for removing from that part of the bed near the inlet for the sewage pieces of carrier material upon which sludge has been deposited, in which the container in a V-shaped tank having a sewage inlet near the point of the V, and an outlet for effluent near the wide portion.

5. An apparatus for treating sewage or the like, which comprises a container for a carrier material adapted to direct a flow of sewage through a bed of carrier material therein, a massive bed of carrier material within said container consisting of pieces sufficiently large to permit ready flow of sewage therebetween and substantially to avoid capillary relation therebetween, and means for removing from that part of the bed near the inlet for the sewage pieces of carrier material upon which sludge has been deposited, in which the container is V-shaped in vertical section, the sewage inlet enters the container near the point of the V, the outlet for the effluent is positioned near the wide portion of the V, and the means for removing the sludge and carrier material is positioned below the inlet at the bottom of the V.

JAMES C. MARS.